(12) United States Patent
Archer et al.

(10) Patent No.: US 11,711,874 B2
(45) Date of Patent: Jul. 25, 2023

(54) LOAD-DEPENDENT ACTIVE GAIN CONTROL FOR POWER FACTOR CORRECTION

(71) Applicant: ERP POWER, LLC, Moorpark, CA (US)

(72) Inventors: Michael Archer, Moorpark, CA (US); Louis Chen, Simi Valley, CA (US); James H. Mohan, Valencia, CA (US)

(73) Assignee: ERP POWER, LLC, Moorpark, CA (US)

( * ) Notice: Subject to any disclaimer, the term of this patent is extended or adjusted under 35 U.S.C. 154(b) by 0 days.

(21) Appl. No.: 17/539,862

(22) Filed: Dec. 1, 2021

(65) Prior Publication Data

US 2022/0095430 A1    Mar. 24, 2022

Related U.S. Application Data

(63) Continuation-in-part of application No. 16/912,583, filed on Jun. 25, 2020, now Pat. No. 11,277,896.
(Continued)

(51) Int. Cl.
*H05B 45/30* (2020.01)
*H05B 45/355* (2020.01)
(Continued)

(52) U.S. Cl.
CPC ........ *H05B 45/355* (2020.01); *H02M 1/4225* (2013.01); *H05B 45/12* (2020.01); *H05B 45/38* (2020.01)

(58) Field of Classification Search
CPC ........ H05B 45/12; H05B 45/37; H05B 45/38; H05B 45/40; H05B 45/46; H05B 45/355;
(Continued)

(56) References Cited

U.S. PATENT DOCUMENTS 7,248,025 B2    7/2007  Adachi
9,131,561 B2*   9/2015  Athalye ............ H05B 45/3725
(Continued)

OTHER PUBLICATIONS

Power Factor Correction (PFC) Handbook, Choosing the Right Power Factor Controller Solution, On Semiconductor, Rev. 5, Apr. 2014, 130 pages.
(Continued)

*Primary Examiner* — Tung X Le
(74) *Attorney, Agent, or Firm* — Lewis Roca Rothgerber Christie LLP

(57) ABSTRACT

An active gain control circuit includes a dynamic voltage divider having a variable resistance configured to attenuate a rectified input line voltage to produce a reference signal, a filter-divider circuit configured to extract a DC-level attenuated reference voltage from the reference signal, and an operational amplifier configured to receive the DC-level attenuated reference voltage and a regulation voltage, and to generate a gate control signal based on a difference between the regulation voltage and the DC-level attenuated reference voltage, the variable resistance of the dynamic voltage divider being controlled by the gate control signal, and a comparison voltage generator configured to attenuate a comparison voltage to generate the regulation voltage.

20 Claims, 2 Drawing Sheets

Related U.S. Application Data

(60) Provisional application No. 63/120,702, filed on Dec. 2, 2020, provisional application No. 62/866,363, filed on Jun. 25, 2019.

(51) Int. Cl.
    *H02M 1/42*      (2007.01)
    *H05B 45/38*      (2020.01)
    *H05B 45/12*      (2020.01)

(58) Field of Classification Search
CPC .. H05B 45/375; H05B 45/382; H05B 45/395; H05B 45/3725
See application file for complete search history.

(56) References Cited

U.S. PATENT DOCUMENTS

| | | |
|---|---|---|
| 9,730,289 B1 | 8/2017 | Hu et al. |
| 10,185,339 B2 | 1/2019 | Fazeel et al. |
| 2005/0184711 A1 | 8/2005 | Chen et al. |
| 2010/0202169 A1 | 8/2010 | Gaboury et al. |
| 2011/0101936 A1 | 5/2011 | Wang |
| 2013/0154487 A1* | 6/2013 | Kuang ............... H05B 45/3725 315/200 R |
| 2014/0232271 A1* | 8/2014 | Wiegele ............ H05B 45/3725 315/127 |
| 2016/0033984 A1 | 2/2016 | Lee |
| 2017/0171931 A1* | 6/2017 | Seki ..................... H05B 45/395 |
| 2017/0188420 A1* | 6/2017 | Kido ...................... H05B 47/24 |
| 2018/0007751 A1* | 1/2018 | Gritti ..................... H02M 1/08 |

OTHER PUBLICATIONS

MPS Boundary Mode PFC Controller, MP44010, The Future of Analog IC Technology, Rev. 1.2, Mar. 18, 2015, 14 pages.

Adragna, C., AN966 Application Note, L6561, Enhanced Transition Mode Power Factor Corrector, Mar. 2003, 21 pages.

\* cited by examiner

LOAD-DEPENDENT ACTIVE GAIN CONTROL FOR POWER FACTOR CORRECTION

CROSS-REFERENCE TO RELATED APPLICATION(S)

This application claims priority to, and the benefit of, U.S. Provisional Application No. 63/120,702 ("LOAD DEPENDENT ACTIVE GAIN CONTROL"), filed on Dec. 2, 2020, the entire content of which is incorporated herein by reference.

This application is a continuation in part of, and claims priority to, U.S. patent application Ser. No. 16/912,583, entitled "ACTIVE GAIN CONTROL FOR POWER FACTOR CORRECTION", filed on Jun. 25, 2020, which claims priority to and the benefit of U.S. Provisional Application No. 62/866,363 ("ACTIVE GAIN CONTROL FOR LINEAR MULTIPLIER OPERATION"), filed on Jun. 25, 2019, the entire contents of which are incorporated herein by reference.

FIELD

Aspects of the present disclosure are related to a system for gain control in a lighting driver and a method for using the same.

BACKGROUND

In current LED lighting applications, LED drivers are generally required to provide a PFC (power factor correction) function, that is, to make an input current in phase with a full-wave-rectified line input voltage. The PFC circuits are often designed for a particular line input voltage range. Some universal input voltage LED drivers use a circuit that selects between two reference signal gain levels for low-line and high-line input voltage operation. However, it may be difficult to meet industry standard requirements for total harmonic distortion (THD) and power factor (PF) across all input voltages.

The above information disclosed in this Background section is only for enhancement of understanding of the disclosure, and therefore it may contain information that does not form the prior art that is already known to a person of ordinary skill in the art.

SUMMARY

Aspects of embodiments of the present disclosure are directed to a load-dependent active gain control circuit coupled to a power factor correction (PFC) controller for use in lighting drivers (e.g., LED drivers). In some embodiments, the active gain control circuit provides continuous (e.g., infinite) variability of reference signal gain level, rather than a few limited discrete gain levels provided by the related art.

According to some embodiments of the present disclosure, there is provided an active gain control circuit including: a dynamic voltage divider having a variable resistance configured to attenuate a rectified input line voltage to produce a reference signal; a filter-divider circuit configured to extract a DC-level attenuated reference voltage from the reference signal; and an operational amplifier configured to receive the DC-level attenuated reference voltage and a regulation voltage, and to generate a gate control signal based on a difference between the regulation voltage and the DC-level attenuated reference voltage, the variable resistance of the dynamic voltage divider being controlled by the gate control signal; and a comparison voltage generator configured to attenuate a comparison voltage to generate the regulation voltage.

In some embodiments, the dynamic voltage divider includes: a first resistor configured to receive the rectified input line voltage; a second resistor coupled to the first resistor; and a voltage-controlled resistor (VCR) coupled in parallel with the second resistor and electrically coupled to the operational amplifier, a resistance of the VCR being determined by the gate control signal.

In some embodiments, the first resistor is electrically coupled between a positive output terminal of a rectifier and a reference input, and the VCR and the second resistor are electrically coupled between the reference input and a negative output terminal of the rectifier.

In some embodiments, the operational amplifier is configured to adjust the resistance of the VCR to regulate a reference voltage at the reference input to be proportional to the comparison voltage.

In some embodiments, the VCR includes: a junction field effect transistor (JFET) having a gate electrically coupled to an output of the operational amplifier.

In some embodiments, the operational amplifier is configured to maintain the JFET in an ohmic region of operation irrespective of the rectified input line voltage.

In some embodiments, the resistance of the VCR is configured to increase as a voltage of the gate control signal increases, and to decrease as the voltage of the gate control signal decreases.

In some embodiments, the filter-divider circuit includes: a third resistor electrically coupled between a reference input and a first input terminal of the operational amplifier; and a fourth resistor electrically coupled between the first input terminal and a negative output terminal of a rectifier, wherein the third and fourth resistors form a voltage divider configured to attenuate the reference signal to generate an attenuated reference signal.

In some embodiments, the filter-divider circuit further includes: a first capacitor coupled in parallel with the fourth resistor, wherein the fourth resistor and the first capacitor form a low pass filter configured to filter the attenuated reference signal and to generate the DC-level attenuated reference voltage at the first input terminal of the operational amplifier.

In some embodiments, the active gain control circuit further includes: a diode coupled between the reference input and the filter-divider circuit and configured to restrict flow of current from the filter-divider circuit to the reference input.

In some embodiments, the active gain control circuit further includes: a second capacitor electrically coupled between an output terminal of the operational amplifier and a first input terminal of the operational amplifier, and configured to lower the bandwidth of the operational amplifier.

In some embodiments, the comparison voltage generator includes: a fifth resistor electrically coupled between a comparison terminal and a second input terminal of the operational amplifier; and a sixth resistor electrically coupled between the second input terminal and a negative output terminal of a rectifier, wherein the fifth and sixth resistors form a voltage divider configured to attenuate the comparison voltage to generate the regulation voltage at the second input terminal of the operational amplifier.

In some embodiments, the filter-divider circuit further includes: a third capacitor coupled in parallel with the sixth resistor, wherein the sixth resistor and the third capacitor are configured to filter noise and fluctuations of the comparison voltage.

In some embodiments, the dynamic voltage divider is configured to generate the reference signal at a reference input of a power factor correction (PFC) controller, and wherein the comparison voltage generator is configured to receive the comparison voltage from a comparison terminal of the PFC controller.

According to some embodiments of the present disclosure, there is provided a power supply system including: a power factor correction (PFC) controller configured to reduce a total harmonic distortion and increase a power factor of the power supply system, the PFC controller having a reference input and a comparison terminal; and an active gain control circuit configured to regulate a voltage at the reference input, and including: a voltage divider having a variable resistance configured to attenuate a rectified input line voltage to produce a reference signal at the reference input; a filter-divider circuit configured to extract a DC-level attenuated reference voltage from the reference signal; and an operational amplifier configured to receive the DC-level attenuated reference voltage and a regulation voltage, and to generate a gate control signal based on a difference between the regulation voltage and the DC-level attenuated reference voltage, the variable resistance of the voltage divider being controlled by the gate control signal; and a comparison voltage generator configured to attenuate a comparison voltage from the comparison terminal to generate the regulation voltage.

In some embodiments, the power supply system further includes: a rectifier configured to rectify an input line voltage to generate the rectified input line voltage; and a converter configured to convert the rectified input line voltage into a drive signal for powering a light source.

In some embodiments, the PFC controller is configured to determine a shape of an input current waveform of the converter based on the voltage at the reference input.

In some embodiments, the input line voltage is from 100 Vac to 277 Vac.

In some embodiments, the voltage divider includes a voltage-controlled resistor (VCR) configured to receive the gate control signal, and the operational amplifier is configured to regulate the voltage at the reference input by increasing a resistance of the VCR in response to the voltage at the reference input being less than the regulation voltage, and decreasing the resistance of the VCR in response to the voltage at the reference input being greater than the regulation voltage.

In some embodiments, the comparison voltage is proportional to an output of a converter.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a system and method for signal gain control in lighting drivers (e.g., LED drivers), provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like elements or features.

Aspects of some embodiments of the present disclosure are directed to a power supply system (e.g., driver) including a load-dependent active gain control circuit that allows high power-factor (PF) and low total harmonic distortion (THD) across a wide-range of input line voltages and output power, with reduced (e.g., minimal) circuitry. In some embodiments, the load-dependent active gain control circuit includes a voltage-controlled resistor (VCR) in a voltage divider to automatically regulate the DC-level of the signal received by a reference pin of a power factor correction (PFC) controller. In some embodiments, the load-dependent active gain control circuit 100 can exhibit continuously (e.g., infinitely) variable gain values (rather than discrete or fixed gain values), thus improving THD and PF (e.g., increasing PF and lowering THD) across a wide range of input line voltages and output power levels. The load-dependent active gain control circuit does not require an independent reference voltage provided by analog circuitry, such as a Zener Diode, or a microprocessor, and instead relies on the signal at the comparison pin of the PFC controller to automatically adjust the DC-level of the haversine signa sampled by the reference input of the PFC controller. This allows the sampled voltage entering the reference pin to be regulated without the need to manually adjust a voltage divider ratio when operating at different input AC voltages.

Figure 1:
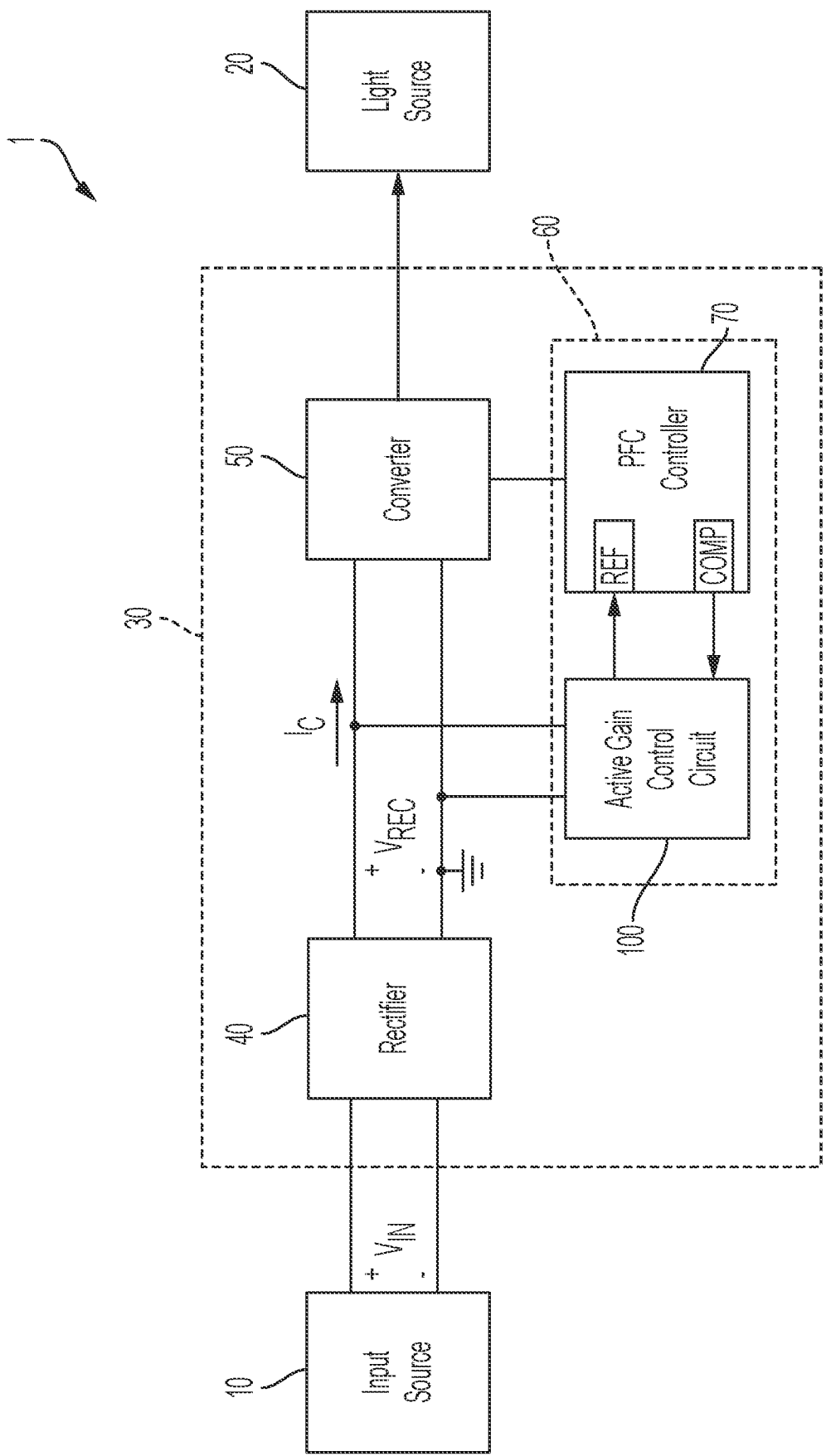
FIG. 1 illustrates a lighting system including a load-dependent active gain control circuit coupled to a power-factor-correction controller, according to some example embodiments of the present disclosure.

FIG. 1 illustrates a lighting system 1 including a load-dependent active gain control circuit 100 coupled to a PFC controller 70, according to some example embodiments of the present disclosure.

According to some embodiments, the lighting system 1 includes an input source 10, a light source 20, and a power supply system 30 (e.g., a switched-mode power supply; also referred to as a driver) for powering and controlling the brightness of the light source 20 based on the signal from the input source 10.

The input source 10 may include an alternating current (AC) power source that may operate at a 100 Vac (e.g., in Japan), 120 Vac (e.g., in the US), a 240 Vac (e.g., in Europe), or 277 Vac (e.g., in large industrial plants). The input source 10 may also include a dimmer electrically powered by said AC power sources. The dimmer may modify (e.g., cut/chop a portion of) the input AC signal according to a dimmer level before sending it to the power supply system 30, and thus variably reduces the electrical power delivered to the power supply system 30 and the light source 20. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The light source 20 may include one or more light-emitting-diodes (LEDs) or an arc or gas discharge lamp with electronic ballasts, such as high intensity discharge (HID) or fluorescent lights.

In some embodiments, the power supply system 30 includes a rectifier 40, a converter 50, and a power factor correction (PFC) circuit 60. The rectifier 40 provides a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The converter 50 converts the rectified AC signal generated by the rectifier 40 into a drive signal for powering and controlling the brightness of the light source 20. The drive signal may depend on the type of the one or more LEDs of the light source 20. For example, when the one or more LEDs of the light source 20 are constant current LEDs the drive signal may be a variable voltage signal, and when the light source 20 requires constant voltage, the drive signal may be a variable current signal. In some embodiments, the converter 50 includes a boost converter for maintaining (or attempting to maintain) a constant DC bus voltage on its output while drawing a current that is in phase with and at the same frequency as the line voltage (by virtue of the PFC circuit 60). Another switched-mode converter (e.g., a transformer) inside the converter 50 produces the desired output voltage from the DC bus.

PFC circuit 60 improves (e.g., increases) the power factor of the load on the input source 10 and reduces the total harmonic distortions (THD) of the power supply system 30. As non-linear loads including the rectifier 40 and the converter 50 distort the current drawn from the input source 10, the PFC circuit 60 counteracts the distortion and raises the power factor. In some examples, other sources of current distortion may be input filter capacitors, input filter chokes, boost inductor, second stage transformer, and any non-linear elements or loads on the secondary side of a transformer inside the converter 50, which would be reflected over to the primary side of the transformer. Further, the main switch (e.g., transistor) in the PFC/boost stage of the converter 50 may also distort the current if it is fed with a constant duty cycle or constant on time. The PFC circuit 60 is capable of counteracting current distortions regardless of the source.

According to some embodiments, the PFC circuit 60 includes a PFC controller (e.g., the current-mode PFC controller) 70 and a load-dependent active gain control circuit 100. The PFC controller 70 controls the converter 50 to ensure that the input current $I_C$ to the converter 50 matches the waveform of the input voltage VREC generated by the rectifier 40. In so doing, the PFC controller 70 senses a current $I_C$ flowing through an inductor of the converter 50 (e.g., the inductor of the boost circuit), and compares this sensed current against the rectified input voltage VREC. Based on this comparison, the PFC controller 70 generates a control signal that controls the on-off timing of a switching element in the converter 50 (e.g., the inductor of the boost circuit), which determines the shape of the input current waveform at the converter 50.

According to some embodiments, the load-dependent active gain control circuit 100 allows the PFC controller 70 to properly monitor the waveform of the rectified input voltage through a reference input (e.g., a PFC reference input) REF. In some examples, the input line voltage VIN may vary over a wide range (e.g., from 100 Vac to 277 Vac). However, this voltage range is too high for the PFC controller 70 to sense directly. The PFC controller 70 may have a linear mode of operation, which the PFC controller 70 should stay within for good performance, with a fairly narrow window of acceptable reference signal level voltages (e.g., voltages within 30% of a nominal value). Thus, in some embodiments, the active gain control circuit 100 actively attenuates the rectified input voltage VREC to bring it down to safe levels for the PFC controller 70 to sense through the reference input REF. Further, the active gain control circuit 100 preserves the shape of the rectified input voltage VREC when attenuating to maintain proper power-factor correction, and low total harmonic distortion (THD) of the input line current $I_C$. In some embodiments, the load-dependent active gain control circuit 100 accounts for the output power level of the driver when adjusting the attenuation of the rectified input voltage VREC to ensure that the signal at the reference input REF is at a proper level irrespective of load conditions.

Some universal input voltage LED Drivers in the related art use a circuit that selects between two reference signal gain levels for low-line (e.g., 120 Vac) and high-line (e.g., 230/277 Vac) input voltage operation. In the related art, a comparator may select which gain level (resistor value of a voltage divider) to use, based on the level of the input voltage. However, with universal input drivers, it may be difficult to meet industry standard requirements for total harmonic distortion (THD) and power factor (PF) (e.g., THD<20% and PF>0.9) across all input voltages. This may stem from only having two discrete gain levels for the reference input REF on the PFC controller chips. One gain level may cover 108-132 Vac, the other gain level may cover 198 Vac-305 Vac. Thus, a driver may perform well at one input line voltage but may perform poorly at another line input voltage. A similar problem may arise with a dimmable driver when the driver may perform well at high output power levels, but poorly at low output power levels, or vice versa. In these scenarios, the comparator may no longer be able to regulate the multiplier voltage to an appropriate level; thus, the driver may not be able to maintain proper PF and THD and may operate inefficiently.

In contrast, the active gain control circuit 100, according to some embodiments, provides continuous (e.g., infinite) variability in gain levels, to match (e.g., exactly match) the required gain for the operating input line voltage VIN and dimmer setting.

Figure 2:
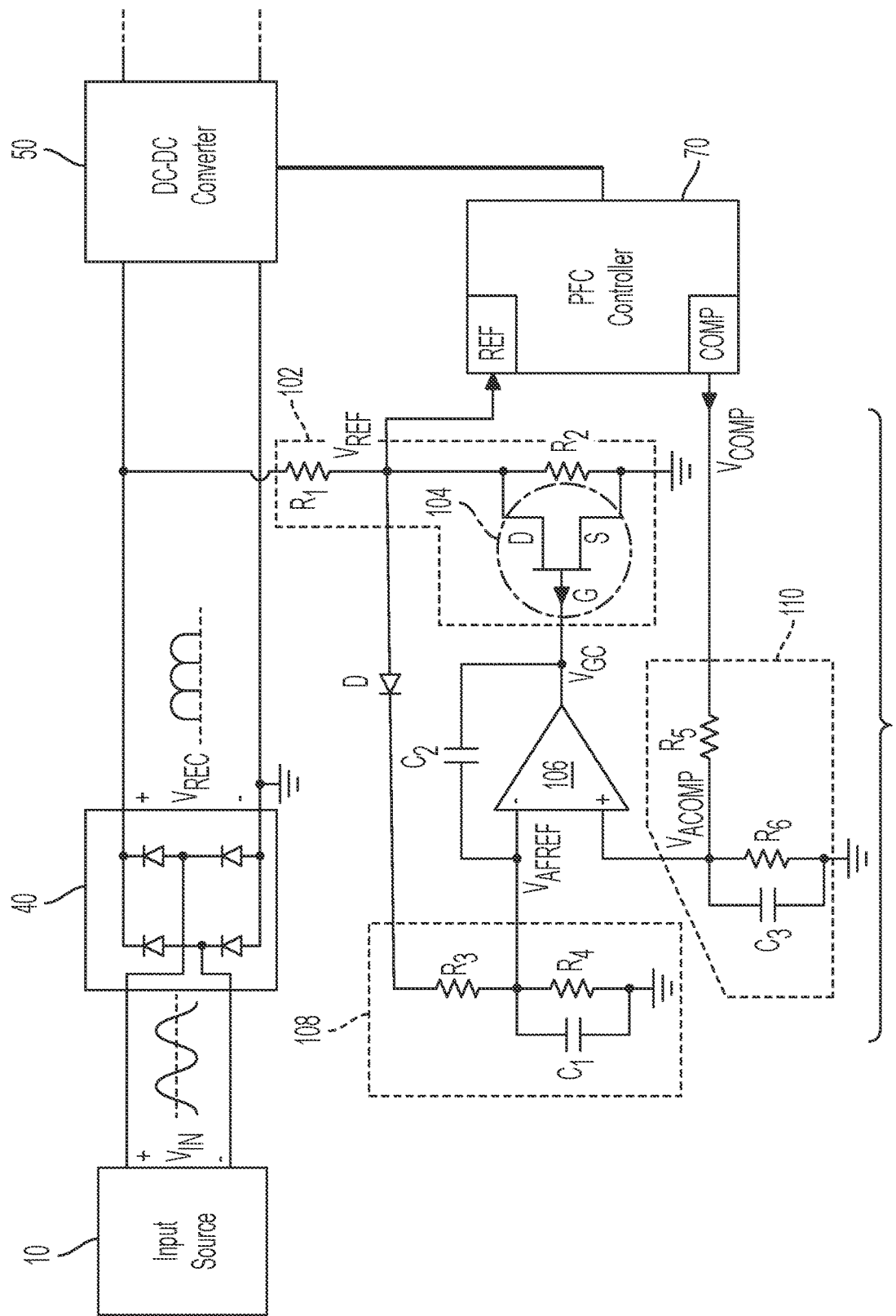
FIG. 2 is a schematic diagram of the load-dependent active gain control circuit, according to some embodiments of the present disclosure.

FIG. 2 is a schematic diagram of the load-dependent active gain control circuit 100, according to some embodiments of the present disclosure.

According to some embodiments, the active gain control circuit 100 includes a dynamic voltage divider 102 configured to produce a voltage $V_{REF}$ at the reference input REF of the PFC controller 70 based on the rectified input voltage VREC. The voltage divider 102 includes a first resistor (a discrete pull-down resistor) $R_1$, a second resistor $R_2$, and a voltage-controlled resistor (VCR) 104 coupled in parallel with the second resistor $R_2$. The first resistor $R_1$ is electrically coupled between a positive output terminal of the rectifier 40 and the reference input of the PFC controller 70, and each of the second resistor $R_2$ and the VCR 104 is electrically coupled between the negative output terminal of the rectifier 40 (which acts as the local ground) and the reference input of the PFC controller 70. The VCR 104 has a variable resistance that is determined based on a gate control signal $V_{GC}$. In some examples, the VCR 104 may have a resistor ranging from about 500Ω to about 10 kn. In some examples, the VCR 104 is a junction field effect transistor (JFET), such as a p-channel JFET, operating in its linear/ohmic region; however, embodiments of the present disclosure are not limited thereto, and any suitable 3-terminal or 4-terminal active device may be utilized as the VCR, such as a metal-oxide-semiconductor field-effect transistor (MOSFET) or the like. The second resistor $R_2$ may serve to place an upper limit on the effective resistance between the reference input of the PFC controller 70 and ground, and thus caps the voltage of the signal at the reference input.

In some embodiments, the load-dependent active gain control circuit 100 further includes an operational amplifier (e.g., an error amplifier) 106 that controls the resistance of the VCR 104 by adjusting the gate control signal $V_{GC}$ that is applied to the gate of the JFET. The operational amplifier 106 ensures that the reference voltage (e.g., the PFC/line-in reference voltage) $V_{REF}$ is always within the acceptable range for the input to the PFC controller 70, regardless of the line input voltage VIN (e.g., regardless of whether it is at 120 Vac or 277 Vac) and dimmer setting (e.g., high or low dimmer setting). Further, by regulating the reference voltage $V_{REF}$, the operational amplifier 106 ensures that the VCR 104 stays within the linear/ohmic range. In examples in which the VCR 104 is a p-channel JFET (as shown in FIG. 2), the operational amplifier 106 may be biased by a positive bias voltage and ground, which may be derived from the bias windings in the converter 50. However, when the VCR 104 is an n-channel FET, the operational amplifier 106 may be biased by a negative bias voltage, which may also be derived from the bias windings in the converter 50. The biasing of the operational amplifier 106 is omitted from FIG. 2 for ease of illustration.

According to some embodiments, the active gain control circuit 100 includes a filter-divider circuit 108 that divides down the reference voltage $V_{REF}$ to a suitable level and filters the attenuated reference voltage to extract its DC-signal level and provides the attenuated and filtered reference signal $V_{AFREF}$ (also referred to as a DC-level attenuated reference voltage) to the first input terminal (e.g., the negative terminal) of the operational amplifier 106. The filter-divider circuit 108 includes a third resistor $R_3$ electrically coupled between the reference input REF and the first input terminal (e.g., the negative input terminal) of the operational amplifier 106, a fourth resistor $R_4$ and a parallel-connected first capacitor $C_1$ each coupled between the first input terminal of the operational amplifier 106 and the negative output terminal of the rectifier 40, which acts as the local ground. Here, the resistances of the third resistor $R_3$ and the fourth resistor $R_4$ determine the level of attenuation of the reference voltage $V_{REF}$, and the parallel-connected fourth resistor $R_4$ and first capacitor $C_1$ act as a low pass filter that extract the DC-level attenuated reference signal ($V_{AFREF}$) used by the operational amplifier 106. However, embodiments of the present disclosure are not limited to an RC filter, and any suitable low-pass filter may be utilized in place of the RC filter. The filter-divider circuit 108 thus allows the operational amplifier 106 to sample the signal at the reference input REF of the PFC controller 70.

In some embodiments, the haversine voltage waveform at the reference input REF is fed to the filter-divider circuit 108 through a diode D that ensures current only flows from the rectifier 40 to the filter-divider circuit 108 and the operational amplifier 106, and not in the reverse direction (e.g., during the low phases of the haversine). In some examples, the anode of the diode is connected to the reference input REF and the filter-divider circuit 108, and the cathode of the diode is connected to the filter-divider circuit 108. In some embodiments, a second capacitor $C_2$ is coupled between the output terminal of the operational amplifier and its first input terminal. The second capacitor $C_2$ may serve to improve the stability of the operational amplifier 106 by reducing its bandwidth and slowing its response. This allows the gate control signal $V_{GC}$ to remain steady despite the presence of noise and fast transients.

Here, the VCR 104 driven by the operational amplifier 106, in parallel with the second resistor $R_2$ can adjust the voltage divider ratio of the dynamic voltage divider 102 to coincide with the AC source that the driver is operating under. This VCR 104 is controlled by the operational amplifier 106 that compares the voltage at the reference input REF of the PFC controller 70 to a regulation voltage VREG.

In some embodiments, the load-dependent active gain control circuit 100 further includes a comparison voltage generator 110 that attenuate the comparison voltage $V_{COMP}$ output by the PFC controller 70 to provide the attenuated comparison voltage $V_{ACOMP}$ (e.g., a constant/fixed voltage for comparison) to a second input terminal (e.g., the positive terminal) of the operational amplifier 106 as the regulation voltage VREG. The comparison voltage generator 110 may include a voltage divider with the fifth and sixth resistors $R_5$ and $R_6$, and a third capacitor $C_3$ connected in parallel with the sixth resistor $R_6$. The RC filter of the comparison voltage generator 110 serves to reduce fluctuations at the comparison voltage $V_{COMP}$, which may result from the ripples present at the output of the converter 50 and the switching noise present throughout the power supply system 30.

According to some embodiments, rather than feeding the operational amplifier an arbitrary fixed reference voltage, such as with a separate microprocessor, the regulation signal that determines the DC level that the reference input REF of the PFC controller 70 is regulated to ($V_{REF}$) is provided by the COMP pin. In some examples, the COMP pin of the PFC Controller 70 is the output of an error amplifier within the PFC Controller 70. This output varies with output power of the converter 50, thus allowing a relationship to be formed between output power and this regulation voltage VREG derived from the COMP pin. In some examples, the comparison voltage $V_{COMP}$ may be about 0.5 V to about 6 V (e.g., about 2.4 V).

The difference, or error, between the regulation voltage VREG and the filtered attenuated reference signal $V_{AFREF}$, coupled with the gain control of the operational amplifier 106 sets the output voltage of the operational amplifier $V_{GC}$, which controls the resistance of the VCR 104. Gain control is achieved via a feedback impedance, which may include the third and fourth resistors $R_3$ and $R_4$, and the first and second capacitors $C_1$ and $C_2$ coupled between the output of the operational amplifier 106 and the first input terminal (e.g., the negative input terminal) of the operational amplifier 106.

In some embodiments, the active gain control circuit 100 regulates the DC-level of the reference voltage $V_{REF}$ to be substantially the same as the regulation voltage VREG (which is determined by $V_{COMP}$) by appropriately adjusting the resistance of the VCR 104. For example, when the DC-level of the attenuated reference voltage $V_{AFREF}$ is less than the regulation voltage VREG (which is the attenuated comparison voltage $V_{COMP}$), the operational amplifier increases the output voltage $V_{GC}$, which causes the resistance of the VCR 104 to also increase, thus raising the DC-level of the reference voltage $V_{REF}$. Similarly, when the DC-level of the attenuated reference voltage $V_{AFREF}$ is greater than the regulation voltage VREG (which is the attenuated comparison voltage $V_{COMP}$), the operational amplifier decreases the output voltage $V_{GC}$, which causes the resistance of the VCR 104 to also decrease, thus lowering the DC-level of the reference voltage $V_{REF}$. This is done irrespective of the input line voltage VIN. Accordingly, when the VCR 104 has sufficient dynamic resistance available, the active gain control circuit 100 can regulate any input line voltage VIN, down to an appropriate signal level for the reference input REF at the PFC controller 70.

The signal level at the reference input REF of the PFC controller 70 may determine the allowable power level at the output of the converter 50. The closer this allowable power level is to the actual output power for a given load, the more power factor and THD may be improved. The active gain control of the circuit 100 allows the power supply system 30 to maintain the same or substantially the same reference level at the reference input REF regardless of the line input voltage level and variations thereof. As the COMP voltage $V_{COMP}$ correlates proportionally with the output, it serves as a control signal for the active gain control circuit 100, which allows the circuit 100 to account for user dimming of the output light or using low voltage LEDs as the light source 20.

As the signal from the COMP pin of the PFC controller 70 is proportional to the output power of the driver, when operating at lower loads (e.g., at dimmed settings), the signal from the COMP pin internally adjusts to a lower value that corresponds with the output of the driver. As such, by regulating the DC level of the reference voltage $V_{REF}$ to be proportional to the COMP voltage $V_{COMP}$, the operational amplifier 106 ensures that the voltage $V_{REF}$ is within the acceptable range for the input to the PFC controller 70, regardless of the line input voltage VIN (e.g., regardless of whether it is at 120 Vac or 277 Vac) and dimmer setting (e.g., high or low dimmer setting). By sampling the signal from the COMP pin of the PFC controller 70, the driver eliminates the need for an independent microprocessor to provide a regulation voltage (Vreg) every time that the driver is dimmed. This may also eliminate the need to modify the regulation voltage that would otherwise be provided by an analog circuitry (such as a zener diode).

In some examples, the first resistor $R_1$ may have a value of about 800 kΩ to about 1.2 MO (e.g., about 1 MO), the second resistor $R_2$ may have a value of about 4 kΩ to about 20 kΩ (e.g., about 8 kΩ), the third resistor $R_3$ may have a value of about 100 kΩ to about 500 kΩ, the fourth resistor $R_4$ may have a value of about 100 kΩ to about 500 kΩ, the fifth resistor $R_5$ may have a value of about 100 kΩ to about 500 kΩ, the sixth resistor $R_6$ may have a value of about 49.9 kΩ to about 500 kΩ, the first capacitor $C_1$ may have a value of about 0.01 μF to about 1 μF, the second capacitor $C_2$ may have a value of about 0.0001 μF to about 0.1 μF, and the third capacitor $C_3$ may have a value of about 0.01 μF to about 1 μF.

Accordingly, by replacing the discrete resistor of the related art with a VCR and resistor combination that is driven by an operational amplifier, which is regulated by a signal proportional to the output of the driver (i.e., the signal from the COMP pin), the load-dependent active gain control circuit 100 can exhibit continuously (e.g., infinitely) variable gain values (rather than discrete or fixed gain values), thus improving (e.g., optimizing) THD and PF performance irrespective of the input voltage level or output power level. The gain level is also controlled by a closed loop feedback network, ensuring the reference voltage level is at a consistent level, which also aids in reducing part-to-part performance variations that would normally have to be screened for during production.

Further, the use of such active gain control circuit 100 in conjunction with the PFC controller 70, eliminates the constant back-and-forth fine tuning a product typically goes through when preparing the product for production. Further, in the related art, the reference signal level resistors have to be adjusted as the LED driver sample size increases, to account for outliers and to ensure a manufacturable product. However, the active gain control circuit according to some embodiments of the present disclosure has a closed-loop, ensuring consistent part-to-part performance.

Furthermore, the active gain control circuit 100 according to some embodiments, simplifies derivative product design. Once the initial main design is complete, derivatives are easy to design, as there is no need to adjust reference signal levels at multiple input voltages.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6.

Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

The power supply system and/or any other relevant devices or components according to embodiments of the present disclosure described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the power supply system may be implemented on a flexible printed circuit film, a tape carrier package (TCP), a printed circuit board (PCB), or formed on the same substrate. Further, the various components of the power supply system, such as the PFC controller, may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and equivalents thereof.

What is claimed is:

1. An active gain control circuit comprising:
    a dynamic voltage divider having a variable resistance configured to attenuate a rectified input line voltage to produce a reference signal, the dynamic voltage divider comprising a voltage-controlled resistor (VCR);
    a filter-divider circuit configured to extract a DC-level attenuated reference voltage from the reference signal;
    an operational amplifier configured to receive the DC-level attenuated reference voltage and a regulation voltage, and to generate a gate control signal based on a difference between the regulation voltage and the DC-level attenuated reference voltage, a resistance of the VCR being controlled by the gate control signal; and
    a comparison voltage generator configured to attenuate a comparison voltage to generate the regulation voltage.

2. The active gain control circuit of claim 1, wherein the dynamic voltage divider further comprises:
    a first resistor configured to receive the rectified input line voltage;
    a second resistor coupled to the first resistor, and
    wherein the voltage-controlled resistor (VCR) is coupled in parallel with the second resistor and is electrically coupled to the operational amplifier.

3. The active gain control circuit of claim 2, wherein the first resistor is electrically coupled between a positive output terminal of a rectifier and a reference input, and
    wherein the VCR and the second resistor are electrically coupled between the reference input and a negative output terminal of the rectifier.

4. The active gain control circuit of claim 3, wherein the operational amplifier is configured to adjust the resistance of the VCR to regulate a reference voltage at the reference input to be proportional to the comparison voltage.

5. The active gain control circuit of claim 2, wherein the VCR comprises:
    a junction field effect transistor (JFET) having a gate electrically coupled to an output of the operational amplifier.

6. The active gain control circuit of claim 5, wherein the operational amplifier is configured to maintain the JFET in an ohmic region of operation irrespective of the rectified input line voltage.

7. The active gain control circuit of claim 2, wherein the resistance of the VCR is configured to increase as a voltage of the gate control signal increases, and to decrease as the voltage of the gate control signal decreases.

8. The active gain control circuit of claim 1, wherein the filter-divider circuit comprises:
    a third resistor electrically coupled between a reference input and a first input terminal of the operational amplifier; and
    a fourth resistor electrically coupled between the first input terminal and a negative output terminal of a rectifier,
    wherein the third and fourth resistors form a voltage divider configured to attenuate the reference signal to generate an attenuated reference signal.

9. The active gain control circuit of claim 8, wherein the filter-divider circuit further comprises:
    a first capacitor coupled in parallel with the fourth resistor,
    wherein the fourth resistor and the first capacitor form a low pass filter configured to filter the attenuated reference signal and to generate the DC-level attenuated reference voltage at the first input terminal of the operational amplifier.

10. The active gain control circuit of claim 8, further comprising:
    a diode coupled between the reference input and the filter-divider circuit and configured to restrict flow of current from the filter-divider circuit to the reference input.

11. The active gain control circuit of claim 1, further comprising:
    a second capacitor electrically coupled between an output terminal of the operational amplifier and a first input terminal of the operational amplifier, and configured to lower a bandwidth of the operational amplifier.

12. The active gain control circuit of claim 1, wherein the comparison voltage generator comprises:
    a fifth resistor electrically coupled between a comparison terminal and a second input terminal of the operational amplifier; and a sixth resistor electrically coupled between the second input terminal and a negative output terminal of a rectifier, wherein the fifth and sixth resistors form a voltage divider configured to attenuate the comparison voltage to generate the regulation voltage at the second input terminal of the operational amplifier.

13. The active gain control circuit of claim 12, wherein the filter-divider circuit further comprises:

a third capacitor coupled in parallel with the sixth resistor, wherein the sixth resistor and the third capacitor are configured to filter noise and fluctuations of the comparison voltage.

14. The active gain control circuit of claim 1, wherein the dynamic voltage divider is configured to generate the reference signal at a reference input of a power factor correction (PFC) controller, and wherein the comparison voltage generator is configured to receive the comparison voltage from a comparison terminal of the PFC controller.

15. A power supply system comprising:

a power factor correction (PFC) controller configured to reduce a total harmonic distortion and increase a power factor of the power supply system, the PFC controller having a reference input and a comparison terminal; and an active gain control circuit configured to regulate a voltage at the reference input, and comprising:

a voltage divider having a variable resistance configured to attenuate a rectified input line voltage to produce a reference signal at the reference input, the voltage divider comprising a voltage-controlled resistor (VCR);

a filter-divider circuit configured to extract a DC-level attenuated reference voltage from the reference signal;

an operational amplifier configured to receive the DC-level attenuated reference voltage and a regulation voltage, and to generate a gate control signal based on a difference between the regulation voltage and the DC-level attenuated reference voltage, a resistance of the VCR being controlled by the gate control signal; and a comparison voltage generator configured to attenuate a comparison voltage from the comparison terminal to generate the regulation voltage.

16. The power supply system of claim 15, further comprising:

a rectifier configured to rectify an input line voltage to generate the rectified input line voltage; and a converter configured to convert the rectified input line voltage into a drive signal for powering a light source.

17. The power supply system of claim 16, wherein the PFC controller is configured to determine a shape of an input current waveform of the converter based on the voltage at the reference input.

18. The power supply system of claim 16, wherein the input line voltage is from 100 Vac to 277 Vac.

19. The power supply system of claim 15, wherein the VCR is configured to receive the gate control signal, and wherein the operational amplifier is configured to regulate the voltage at the reference input by increasing a resistance of the VCR in response to the voltage at the reference input being less than the regulation voltage, and decreasing the resistance of the VCR in response to the voltage at the reference input being greater than the regulation voltage.

20. The power supply system of claim 15, wherein the comparison voltage is proportional to an output of a converter.

* * * * *